March 18, 1947.      R. L. FINDLEY ET AL      2,417,745
QUICK RESPONSE CONTROL SYSTEM FOR DYNAMOMETERS
Filed April 26, 1943
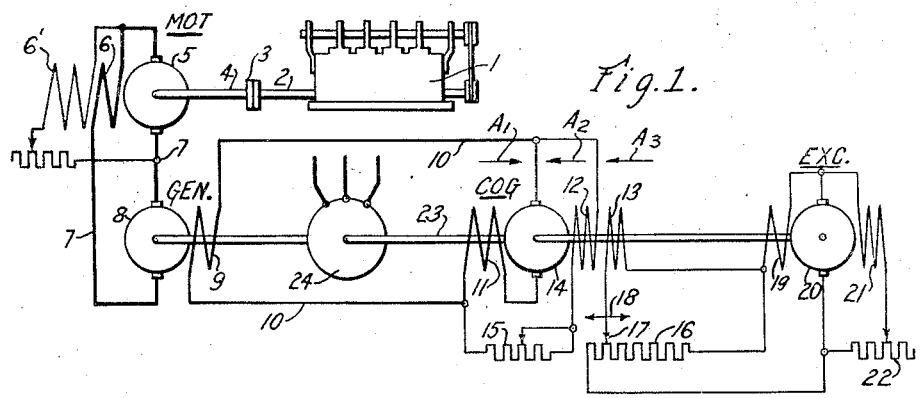
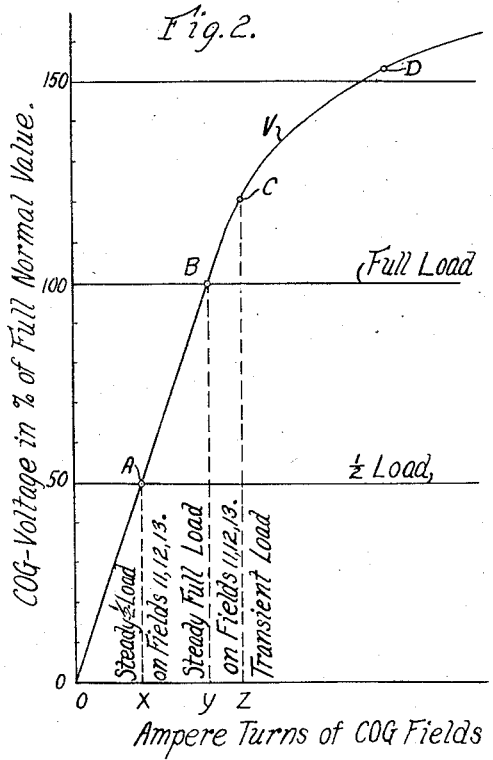
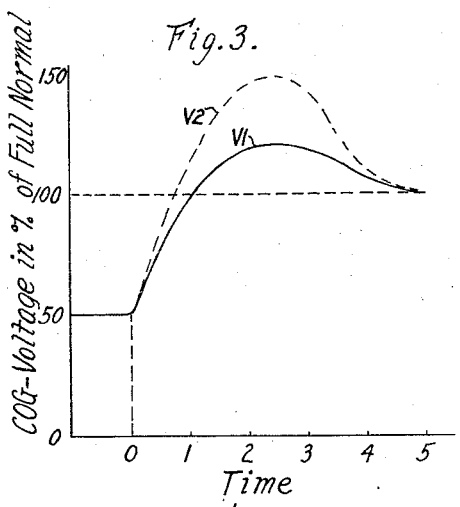
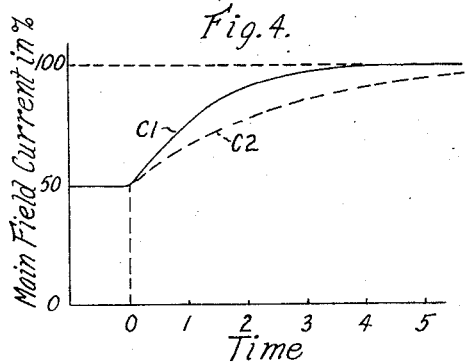
WITNESSES:
INVENTORS.
Russell L. Findley and
Jay R. Wrathall.
BY
Paul E. Friedemann
ATTORNEY Patented Mar. 18, 1947

2,417,745

UNITED STATES PATENT OFFICE 2,417,745

QUICK RESPONSE CONTROL SYSTEM FOR DYNAMOMETERS

Russell L. Findley, Detroit, Mich., and Jay R. Wrathall, Pittsburgh, Pa., assignors to Westinghouse Electric Corporation, East Pittsburgh, Pa., a corporation of Pennsylvania Application April 26, 1943, Serial No. 484,542

1 Claim. (Cl. 73—116)

Our invention relates to systems for controlling the field current of electric machines, particularly generators.

In electric drives, energy transmissions, testing devices, controls, and the like systems in which generator cascades or the like generator-motor assemblies are employed, it is often necessary that the output of one of the electric machines of the assembly respond to changes of a control or measuring magnitude. A known and customary way of obtaining such a response is to vary the field excitation of the machine so that its armature output changes accordingly. Due to the inertia involved in such a machine assembly, caused by the mechanical, magnetic, and inductive changes incident to the control function of the assembly, a certain sluggishness of response is inherent to systems of the type here referred to.

While for many applications this sluggishness is of no or little concern, there are other purposes which require a rapid response to fast-changing control impulses so that systems of the above-mentioned type are less suitable in their forms heretofore available and would afford considerable improvement or avail themselves to new uses if they could be rendered capable of a more speedy response.

For instance, there are dynamometric loading devices for determining the torque, energy output, and other characteristics of prime movers, such as aircraft engines and other internal combustion engines, in which the armature of an electric machine is coupled with the drive shaft of the engine to be tested, while the field of the electric machine is energized by the armature output circuit of a generator whose field winding is excited in dependence upon a variable control magnitude. A considerable improvement would be obtained in such dynamometric loading devices if the generator responded more rapidly to changes in control magnitude than in the known loading devices of this kind. Similarly, there are other fields, such as that of machine tool controls, where an acceleration in field response would be of advantage.

It is an object of our invention to provide a control system for varying the energization of an electric machine, particularly the field energization of a generator, which is superior to the known generator and generator-motor assemblies, as regards the response characteristic above mentioned.

More specifically, the invention aims at providing the field winding of an electric machine as a generator with a controllable excitation that responds to changes of a control magnitude more rapidly than possible in the known field control systems.

It is also an object to afford the just-mentioned advantage by simple and economical means and with the aid of rotary electric machines rather than electronic discharge devices in the control portion proper of the quick-response system.

A further object, allied to the foregoing, is to combine a generator, the field current of which is to be controlled, with the devices serving to effect this control, so as to obtain a single machine unit.

In order to achieve these objects and in accordance with our invention, we connect the field winding to be controlled, hereinafter called the "main" field winding for better distinction, with a special control generator in a manner set forth presently. The special control generator has its armature circuit connected to the main field winding. Three control field windings are provided at the control generator. Each of the control field windings is, for instance, preferably though not necessarily rated for substantially full capacity. Two of these windings act in opposition to each other so as to exert a differential effect on the armature circuit and hence on the excitation current of the main field winding. The two differential windings are connected to the armature circuit, one in series to the main field winding so as to be excited in accordance with its field current and the other parallel to the main field winding so as to react to the main field voltage. The differential windings are adjusted, preferably with the aid of an adjusting rheostat or the like variable circuit means, so that they balance their effects on the armature of the control generator when the system is in steady operation; as a result, the energization of the main field winding is normally in accordance with the control condition then prevailing. The third field winding of the control generator is connected to a current source of constant voltage through a potentiometric rheostat or other variable circuit element. Consequently, the energization of the third field winding is varied in accordance with the control condition or magnitude which governs the desired ultimate control function. Since at steady operation of the system the effects of the two differential field windings cancel each other, the excitation of the main field is determined by that of the third field winding of the control generator and hence by the adjustment of the circuit element controlling the current in the third winding. However, when this adjustment is changed, the differential balance is temporarily disturbed with the result of obtaining an accelerated response of the main field to the effected or still progressing change. This accelerating effect will be understood from the following description of the embodiment illustrated in the drawing in which:

Figure 1 exemplifies a control system according to the invention by showing a circuit diagram of a dynamometric device for testing internal combustion engines, while Figs. 2, 3, and 4 are explanatory diagrams relating to the same embodiment.

In Fig. 1, the internal combustion engine to be tested is designated by 1. The drive shaft 2 is coupled, at 3, with the shaft 4 of the armature 5 of an electric machine MOT acting as a motor or as a generator depending upon the dynamometric test to be made. For instance, when testing the compression properties of the engine 1, the machine MOT acts as a drive motor. When performing a braking test, MOT functions as a generator. For the sake of simplicity and clarity, the operation of MOT as a motor is especially referred to in the following.

Motor MOT has a series field winding 6 and a shunt field winding 6'. Winding 6 is connected in series with its armature 5 in the armature output circuit 7 of a generator GEN, hereinafter called "main" generator for better distinction from the other generators mentioned hereinafter. The armature 8 of the main generator is acted upon by a main generator field winding 9. The generator output voltage in circuit 7 and the torque of the motor MOT depend on the energizing current in winding 9. This current is supplied by control circuit 10 from a control generator COG. The armature 14 of generator COG is acted upon by three field windings 11, 12, and 13, each rated for full capacity. Winding 11 is connected in circuit 10 in series to armature 14 and winding 9 and hence is energized in accordance with the energizing current of the main generator field winding 9. Winding 12 of COG is also connected to circuit 10 but lies in parallel to the main field winding 9 so as to be energized in accordance with the voltage drop across winding 9. The windings 11 and 12 act in opposition to each other as regards their effect on the armature 14 of the control generator COG, that is, their resultant control effect is differential. This is indicated in Fig. 1 by the arrows marked A1 and A2. A3 denotes the direction of the field excitation produced by winding 13, although it will be understood that the field of winding 13 may also have a polarity opposite to that indicated by arrow A3, depending upon the desired polarity of the output voltage of control generator COG. A rheostat 15 is arranged in the parallel connection of winding 12 in order to permit adjusting the differential effect to zero. Once this adjustment is made, rheostat 15 need not be changed during the operation of the system.

The third field winding 13 of the control generator COG is connected to a potentiometer rheostat 16 whose slide contact 17 is adjustable in either direction indicated by the arrows 18. The terminals of rheostat 16 are connected to a current source of constant voltage here formed by an exciter generator EXC. The armature of this exciter is denoted by 20. The exciter is provided with a self-excited series-connected field winding 19 and a self-excited shunt field winding 21. A rheostat 22 in the circuit of the shunt winding permits adjusting the exciter output voltage. Once adjusted, the rheostat 22 need not be actuated during the operation of the system.

The armatures of the main generator GEN, control generator COG, and exciter EXC are operated at constant speed. Separate drive motors may be employed for this purpose. According to a preferred embodiment, however, and as illustrated in Fig. 1, the three armatures 8, 14, and 20 are mounted on a common drive shaft 23 which is driven by a constant-speed motor 24, such as an alternating-current induction motor.

When in operation, the above-described system functions as follows: As long as slide contact 17 remains at rest with the whole system in steady operation, the balanced effects of windings 11 and 12 cancel each other as regards the energization of the main field winding 9. Consequently, the current in winding 9 and hence the voltage in circuit 7 and the speed of motor MOT are now determined by the strength of field 13 and depend only on the position of contact 17 relative to resistor 16.

In order to vary the energization of the main generator field winding 9, the slide contact 17 is displaced in accordance with the desired field variation. While such a displacement is being effected, the excitation of field winding 13 is varied accordingly so that the control generator COG tends to change the current and voltage in armature circuit 10 to corresponding values until the energization of the main field winding 9 is in conformity with the new setting of contact 17. However, the transient adjusting phenomena occurring in the circuit connections of the control generator COG impose an essential rate of change on the variation of the main field energization. For a better understanding of these phenomena, it should be noticed that the full load current of the control generator COG is identical with the normal full load current of the main generator field winding 9 so that the load current of the control generator COG will increase or decrease in direct proportion to the output voltage of the control generator COG. Thus, the ampere turns of the series-connected field winding 11 will increase or decrease directly with the load current or voltage of the control generator COG, while the ampere turns of the parallel winding 12 vary in dependence upon the voltage appearing across the main field winding 9.

Let us now assume that contact 17, before its displacement, is in a position where the main generator field current is one-half the full load value. Then the current output of the control generator COG is also at one-half of its full load current, and the voltage across the main field winding (output voltage of COG) is likewise one-half of its full value. This condition is represented in the diagram of Fig. 2 in the following manner:

In Fig. 2, the curve $v$ represents schematically the voltage of the control generator COG, plotted in per cent of the full normal voltage value, in dependence upon the effective resultant ampere turns per pole of the three coacting field windings 11, 12, and 13 of the control generator COG. At steady one-half load operation, point A in the diagram represents the output voltage of COG with the value OX representing the steady one-half load on each of the three field windings 11, 12, and 13 of COG.

If starting from these conditions, contact 17 is now moved to a new position corresponding to full load (100% load), the main generator field 9 is expected to develop quickly an increased energization also corresponding to 100% load as represented by point B in Fig. 2. The displacement of contact 17 causes the separately excited field 13 of COG to increase its energization from OX to the full load value OY. As a result, the output voltage of the control generator starts building up. The current through the main generator field winding 9 begins also to increase. Due to the inductive effect of the main generator field, however, the field current will not increase as rapidly as the voltage. This means that the differential series field 11 of the control generator does not keep up with the output voltage of this generator and, temporarily, does not balance the self-excited field of winding 12. Therefore, the effect of winding 12 on armature 14 predominates over that of winding 11 and causes the output voltage of the armature to accelerate its increase and to overshoot the final value. Referring to the diagram of Fig. 2, the disturbed balance of windings 11 and 12 has the effect that the resultant ampere turns acting on the armature of the control generator increase beyond the value OY and pass through transient higher values such as OZ. That is, the output voltage of the control generator overshoots its ultimate aim (point B) and passes beyond the value corresponding, for instance, to point C. If the inductance in the main generator field were infinite, the voltage of COG would reach a value near point D. In fact, the overshooting does not go that far; but it is of sufficient magnitude to accelerate the change of the main field energization to the desired, newly adjusted value. This will be more fully understood from the diagrams shown in Figs. 3 and 4.

Fig. 3 represents the output voltage of the control generator COG in per cent of its full normal value plotted against time, the time values being subdivided in arbitrary units, for instance 1/100 of a second for each unit value. As exemplified in the foregoing, the voltage was steady at 50% of its full value when the system was caused by contact 17, at the moment O, to change the excitation of the main field to 100% load. Curve V1 represents diagrammatically the corresponding changes of the output voltage of COG from 50% to 100% of its normal full value, while curve V2, shown by a dash line, indicates the theoretical voltage curve under conditions where the inductance of the main generator field is extremely high (infinite) as compared with that of the control generator. It appears from the diagram that, although V1 has a reduced rate of changes as compared with the theoretical maximum, it rises rapidly beyond the ultimate value (100%) and then drops back to approach the 100% value from higher magnitudes.

The result of this overshooting is apparent from Fig. 4. In this figure, the energizing current in the main field winding 9 in per cent of its normal full value is plotted against time, the latter being measured by the same unit, as chosen in Fig. 3. Curve C1, rising from 50% to 100% load, represents the rate of change afforded by the quick-response system by virtue of the overshooting effect indicated by Fig. 3. Curve C2, shown in Fig. 4 by a dash line, represents the field current as obtained from an ordinary control generator, i. e., without the quick-response features of the invention. Due to the acceleration effect, the excitation C1 reaches its newly adjusted value much more rapidly than in an ordinary system of this type.

Reverting now to Fig. 1, it will be seen that when the adjustment of the slide contact 17 is changed, the excitation of the main generator field 9 follows quickly and causes the armature 8 of the main generator GEN to vary its output voltage accordingly. As a result, the motor MOT tends to change its torque or speed, depending upon the loading conditions, with similar rapidity and much more speedily than in the control systems heretofore used for arrangements of this type.

It will also be apparent that while we have illustrated and specifically described a dynamometric loading device for testing internal combustion engines, the invention is likewise applicable to other control systems in which the operation of a motor or the output voltage or current of a generator is to be controlled by means of a Ward Leonard or cascade system of generators. In such systems, according to the invention, the main generator to be controlled may either be for direct current or alternating current without affecting the construction and operation of the field control system proper.

The foregoing description of the illustrated embodiments shows that the function of the potentiometric rheostat 16 and its slide contact 17 is to control the excitation of the separately controlled field winding 13 of the control generator COG. Obviously, any other variable impedance or circuit means capable of controlling the excitation current or voltage may also be employed, depending upon the particular design and requirements under consideration. The adjustment of the variable impedance or circuit member for controlling the field winding 13, such as the slide contact 17, may be effected manually, or automatically in dependence upon a condition controlled by the generator system.

It will be noted from Fig. 1 and the appertaining description that a control according to the invention, despite its wide range of control, requires no relays, switches, or other contactors in the operating network proper and performs its function without requiring the use of controllable discharge vessels. That is, the quick-response characteristic of a generator control system according to the invention is achieved entirely with the aid of generators of the type generally employed in Ward Leonard or cascade arrangements and hence affords the reliability, sturdiness, and insensibility to rough operating conditions peculiar to this general type of control arrangement.

We claim as our invention:

A dynamometric loading device for testing engines, comprising an electric direct current machine, means for mechanically connecting said machine with the engine to be tested, a main direct current generator having an armature electrically connected to said machine, said main generator having a field winding to coact with said armature, a control generator having an armature circuit connected to said main generator field winding and three control field windings for controlling the voltage in said armature circuit, two of said control field windings being disposed in differential relation to each other, one of said differential windings being series connected in said armature circuit and the other being connected in parallel to said main generator field winding so as to normally balance the effect of said first differential winding on said armature of said control generator, a constant voltage source connected with the third of said control field windings, control means disposed between said third control field winding and said source for adjusting the energization of said latter winding, and means for driving said main generator armature and said control generator armature at constant speed.

RUSSELL L. FINDLEY.
JAY R. WRATHALL.

REFERENCES CITED

The following references are of record in the file of this patent:

UNITED STATES PATENTS

| Number | Name | Date |
| --- | --- | --- |
| 2,116,420 | Whiting | May 3, 1938 |
| 2,247,166 | Edwards | June 24, 1941 |
| 2,285,195 | Edwards | June 2, 1942 |
| 2,300,960 | Porter | Nov. 3, 1942 |
| 2,347,037 | Edwards et al. | Apr. 18, 1944 |

FOREIGN PATENTS

| Number | Country | Date |
| --- | --- | --- |
| 36,070 | Norwegian | Oct. 30, 1922 |